United States Patent
Gerin et al.

[15] 3,699,215
[45] Oct. 17, 1972

[54] PRODUCTION OF CARBON DISULPHIDE FROM HYDROCARBONS

[72] Inventors: Paul Gerin, Clair du Rhone; Lucien Louat, Lyon; Jean-Pierre Quillet, les Roches de Condrieu, all of France

[73] Assignee: Progil, Paris, France

[22] Filed: March 19, 1969

[21] Appl. No.: 808,598

[30] Foreign Application Priority Data

March 26, 1968 France .................... 68145513

[52] U.S. Cl. ................................ 423/443, 23/277
[51] Int. Cl. .................................... C01b 31/26
[58] Field of Search .................. 23/277, 284, 206

[56] References Cited

UNITED STATES PATENTS

| | | |
|---|---|---|
| 2,556,430 | 6/1951 | Marisic .................. 23/206 X |
| 2,668,752 | 2/1954 | Folkins et al. .......... 23/206 |
| 2,989,380 | 6/1961 | Weiss et al. ............ 23/277 |
| 3,250,595 | 5/1966 | Olsen ..................... 23/206 |
| 3,436,181 | 4/1969 | Berthoux et al. ...... 23/206 |
| 2,971,969 | 2/1961 | Lobo ................... 23/252 X |

FOREIGN PATENTS OR APPLICATIONS 620,315   3/1949   Great Britain ............ 23/206

Primary Examiner—Oscar R. Vertiz
Assistant Examiner—Charles B. Rodman
Attorney—Browdy and Neimark

[57] ABSTRACT

A method for continuously producing $CS_2$ by reacting sulphur in the gas phase with an unsaturated aliphatic hydrocarbon, such a propylene, in sulphurating apparatus in which the sulphur circulates the hydrocarbon being injected into the apparatus at at least two points and then condensing and recovering the $CS_2$ therefrom. The sulphurating apparatus may include a reactor in addition to a coil within a furnace, and one of the points of injection can be to the reactor.

9 Claims, 1 Drawing Figure

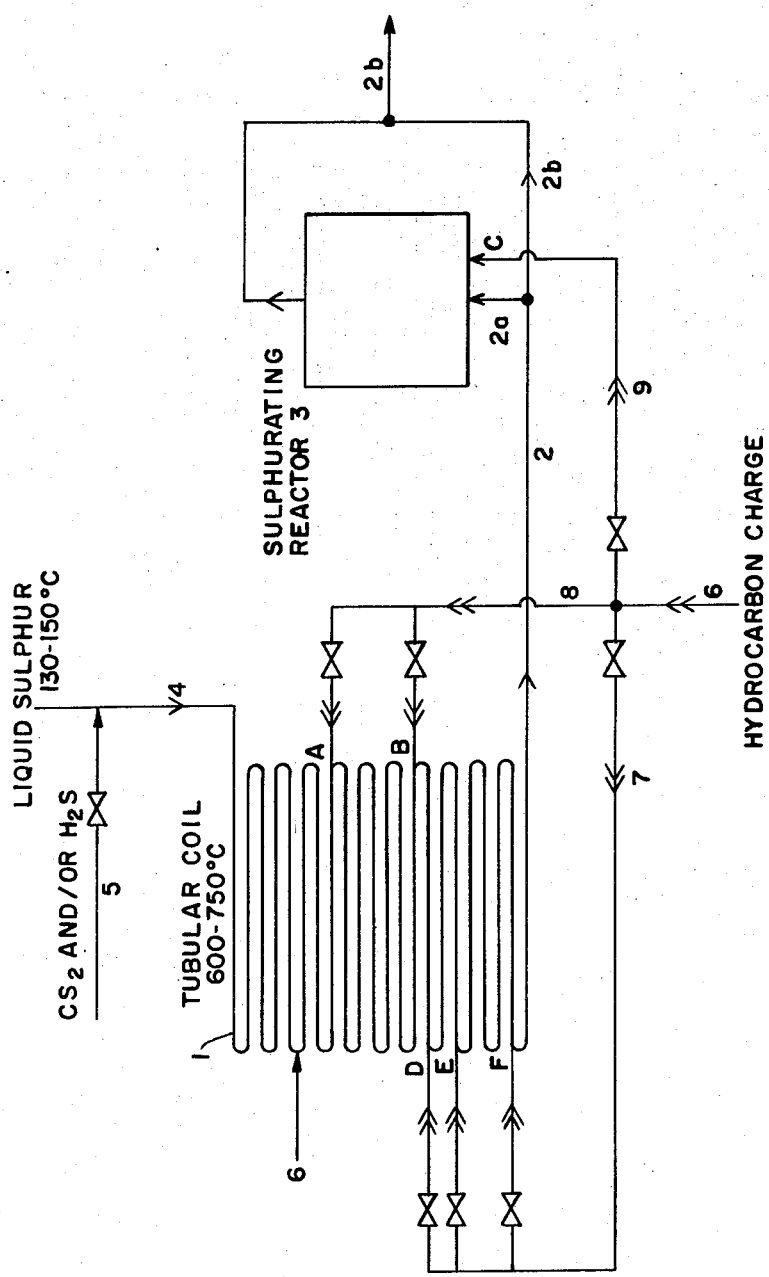

PRODUCTION OF CARBON DISULPHIDE FROM HYDROCARBONS

The present invention relates to a novel method of reacting sulphur and a hydrocarbon charge, preferably consisting of unsaturated aliphatic hydrocarbons, for the production of carbon disulphide. The invention relates to a method wherein the reactants are introduced into conventional apparatus to yield very pure carbon disulphide in excellent yields by a continuous industrial operation.

Applicants have previously described a process for the continuous production of $CS_2$ by reacting sulphur with an olefin or a diolefin in the absence of any catalytic system, at a temperature between 600° and 850° C., with contact times of between 0.1 and 20 seconds. In this previous process, the sulphur, which is generally employed in an excess over the stoichiometrically necessary quantity, optionally diluted with $CS_2$ and/or $H_2S$, is preheated in a furnace at a temperature of at least 550° C. and thereafter continuously passed into a sulphurating reactor supplied with unsaturated hydrocarbon, which is optionally preheated. After sulphuration under the aforesaid chemical conditions, the gaseous effluents are condensed and the unreacted sulphur and the uncondensed gases are separated from the $Cs_2$ produced. (U. S. application Ser. No. 605,555 filed Dec. 29, 1966, now U.S. Pat. No. 3,436,181.)

This method, wherein the unsaturated hydrocarbon employed as starting material is directly introduced either into the sulphurating reactor or into the sulphur-preheating furnace, makes it possible to obtain substantially quantitative rates of conversion of hydrocarbon to carbon disulphide, which has a purity of the order of 99.99 percent. However, it is not always satisfactory in industrial operation owing to the difficulties inherent in the thermal control of the reaction.

It has now been found that it is possible by means of a new method of introducing the reactants into the sulphurating apparatus and distributing them therein to control the progress of the reaction with precision, especially from the thermal viewpoint, by controlling the respective proportions of sulphur, hydrocarbon, carbon disulphide and hydrogen sulphide. There is thereby obtained a rapid and complete reaction.

The novel process according to the present invention consists in effecting at least two injections of unsaturated hydrocarbon at different points into the sulphurating apparatus in which the hot sulphur circulates.

By "sulphurating apparatus" is meant the apparatus, already known per se, in which the supply of heat necessary for the reaction, and the sulphurating reaction itself take place. This apparatus precedes the battery of units in which the conventional operations involving condensation of the gaseous effluents, absorption and desorption treatments and distillation of the $CS_2$ take place. Such apparatus may consist, for example, of a tubular coil disposed inside a furnace, to which there may be attached through pipes one or more reactors containing packing masses and optionally a catalytic system, in which the sulphurating reaction is completed.

By "reaction volume" is to be understood the volume of apparatus, as seen in the downstream direction, between the first introduction of hydrocarbon charge into the sulphurating apparatus and the end of this apparatus.

Although the technique of successive injections of hydrocarbons may be employed, in accordance with the invention, at any points of the sulphurating apparatus, for example in the tubular coil heated by a furnace and thereafter at the inlet of the aforesaid reactor or reactors, the preferred and particularly advantageous form of invention consists in introducing the charge of unsaturated hydrocarbons at at least two points of the coil fed with sulphur, one of which points may be situated in a single sulphurating reactor optionally provided after the furnace.

The new technique of injections at multiple points will be more readily understood with reference to the diagram accompanying the present description.

The FIGURE which is a diagram illustrating the principle of a sulphurating apparatus according to the invention shows a tubular coil 1 situated in a furnace (not shown) and having its outlet connected by the pipe 2, either to a sulphurating reactor 3 as at 2a, or to all the conventional apparatus for the treatment, recovery and purification of the effluents (not shown in the figure), as at 2b.

In practice, in the arrangement shown, the coil 1, heated at temperatures between 600° and 750° C., is supplied at its upper part, through the pipe 4, with liquid sulphur preheated to a temperature of about 130°–150° C. The sulphur — of which the excess over theoretical is generally between 1 percent and 50 percent — is optionally diluted, before entering the coil, with $CS_2$ and/or $H_2S$ which optionally are obtained from recycling fractions and are introduced through the pipe 5. The hydrocarbon charge employed as starting material and arriving through the general pipe 6 is injected in accordance with feature of the invention at a number of points in the sulphurating apparatus. In accordance with a first embodiment, the hydrocarbon charge is passed, at normal temperature, only into the coil along the paths 7 and/or 8 at at least two of the points of the coil represented by the letters A, B, D, E and F.

In accordance with another embodiment, which constitutes a variant of the preceding one, the stream arriving through 6 is divided into 2 fractions of variable volumes which are introduced on the one hand into the coil — through the pipe 7 or 8 — and on the other hand through the pipe 9 into the sulphurating reactor 3 which may be mounted after the furnace. The introduction of the hydrocarbon stream into this reactor is indicated at the point C situated at the bottom of the apparatus, but it is obvious that this type of injection may be carried out at any other point of the reactor. The gaseous effluents emanating either from the coil 1 in accordance with the first mode of operation or from the reactor 3 in the case of the variant are passed through the pipe 2b into the conventional apparatus for the well known after-treatment operations, namely condensation of the sulphur, washing and absorption and desorption of the gases, and distillation of the $CS_2$.

The chemical conditions for the sulphurating reaction are not a part of the present invention, since they have been described in the previously referred to process of applicants. However, it is important to emphasize that the technique of injection of the hydrocarbon charge at multiple points affords the possibility of having at each point of injection a considerable excess of sulphur over the stoichiometry of the hydrocarbon fraction introduced. Now, it has been found that an excess of sulphur has a particularly favorable effect on the inhibition of the formation of carbonaceous or tarry by-products. As stated above, the sulphur may be diluted before it is introduced into the furnace, notably with carbon disulphide, preferably in vaporized form, the ratio of S to $CS_2$ generally being between 1:0.1 and 1:1.5 by weight. In the temperature range (600°–750° C.) and the pressure range (1 to 10 bars) which are generally adopted in accordance with the conventional processes, the residence time may be very short, particularly when the coil constitutes the only sulphurating apparatus, and preferably is between 1 and 5 seconds.

The hourly space velocity (HSV) (ratio of the volume per hour of all the reactants and diluents, if any, introduced into the sulphurating apparatus and taken in gaseous form at 0° C. under 760 mm.Hg. — the sulphur being considered in the form $S_2$ — to the reaction volume as defined above) may vary within wide limits, for example between 50 and 10,000. However, it has been found that the adoption of HSV values above 1,000, for example between 1,200 and 5,000 h.$^{-1}$ affords a possibility of obtaining optimum critical conditions for the production of a very pure $CS_2$ with a quantitative rate of conversion of the hydrocarbon charge.

The number of injections of the hydrocarbon charge into the sulphurating apparatus according to the invention may be equal to or higher than two and may reach four to five, the upper limit to be adopted being determined only by technological requirements. Thus, for example, when this apparatus is limited to a single coil, the injections may be carried out at two, three or more of the points indicated by A, B, D, E and F, these points being located at varying distances from the level at which the sulphur is introduced and being offset from one another. When a sulphurating reactor is combined with the coil in accordance with the variant of the process of the invention, the hydrocarbon charge is introduced partly into the reactor, for example at the base (C), and partly into the coil, at at least one point of the latter. In the latter embodiment, the reactor may optionally contain therein an inert solid material, such as Raschig rings, for example, which act to favor the contact between the gaseous reactants.

The unsaturated hydrocarbon charge employed as starting material may consist, as stated in the Applicants' prior application, of olefins such as ethylene, propylene, the butenes, the light olefin cuts resulting from petroleum cracking, diolefins such as butadiene, isoprene, etc., or of mixtures of these products. These unsaturated hydrocarbons (the composition of which may vary from one injection to the other) may be employed in the pure state or in the form of industrial products.

The new mode of injection at a plurality of points of the sulphurating zone is not, however, limited to the case of the use of an unsaturated hydrocarbon in major proportions in a hydrocarbon charge, but the technique of the invention may be usefully put into practice, with the same advantages of flexibility of operation and ready control of the thermal profile of the sulphuration, when the hydrocarbon charge consists partly of saturated hydrocarbons and partly of unsaturated hydrocarbons, whether they be introduced separately or in admixture at the different levels of the sulphurating apparatus. Thus, for example, when "mixed" operation with a methane charge and a propylene charge is desired, the weight ratio of $CH_4$ to $C_3H_6$ may be varied between the limits of 1:0.1 and 1:10. When such starting materials are adopted, the methane may be introduced into the upper part of the coil (for example between the pipe 4 and the point A in the accompanying figure) at one or more points, and the propylene may be injected at at least two points situated downstream of the injection of the methane, one of which points may be at the base of a sulphurating reactor optionally associated with the furnace. For example, $CH_4$ can be introduced at the point G into the coil in which the sulphur is already vaporized, while the propylene can be injected either both at the points B (coil) and C (reactor) or at at least two of the points A, B, E and F into the coil (absence of the reactor). In addition, in the case where the sulphurating zone comprises a coil and a reactor, it may be advantageous to introduce into the reactor a catalytic mass which may consist, for example, of silica gel.

The following examples illustrate a number of modes of practical application of the process according to the invention on an industrial scale.

EXAMPLES 1 TO 4

Continuous production of carbon disulphide by sulphuration of industrial propylene (containing 6 percent of propane) was carried out in a sulphurating apparatus consisting of a single coil such as that shown at 1 in the accompanying figure (without the reactor 3).

The liquid sulphur introduced into the coil through the pipe 4 at an initial temperature of 140° C. was in a quantity exceeding by about 20 percent the stoichiometrically necessary quantity. The propylene was injected at normal temperature into the coil by means of appropriate nozzles at the points A and B, at rates differing in each test. In the apparatus illustrated purely by way of example in the drawing, in which the furnace contains a tubular coil of a diameter of 20 mm., consisting of corrosion-resistant metal, the points A and B were situated at 42 meters and 21 meters respectively from the outlet of the furnace, the total length of the coil being 100 meters.

Under the reaction conditions summarized in the following table and at hourly space velocities between 1,820 and 2,580, a liquid titrating more than 99.9 percent of $CS_2$ was obtained after separation of the excess of sulphur and the condensation of the gaseous effluent. The rate of conversion of propylene to $CS_2$ was substantially quantitative.

| ex. no. | duration (hours) | Rates of flow (in kg/h) sulphur | $C_3H_6$ at A | $C_3H_6$ at B | absolute pressure (bars) | reaction temp. (°C.) | Impurities in the $CS_2$ (in p.p.m.$^2$) Benzene | Thiophen | ratio of carbon to excess of sulphur (% by wt.) |
|---|---|---|---|---|---|---|---|---|---|
| 1 | 85 | 82 | 5 | 5 | 4.5 | 680 to 700 | 150 | 250 | 0.03 |
| 2 | 85 | 66 | 6 | 2 | 4.5 | 680 to 700 | 250 | 150 | 0.03 |
| 3 | 40 | 58 | 5 | 2 | 3.5 | 680 to 700 | 250 | 150 | 0.01 |
| 4 | 65 | 58 | 2 | 5 | 4.0 | 680 to 700 | 300 | 350 | 0.05 |

EXAMPLE 5

There were continuously introduced into the coil, per hour, at the inlet (through 4):

- 66 kg. of sulphur preheated at 140°C. (i.e. a total excess of 20%)
- At the level A: 5 kg. of industrial propylene (6% of propane)
- At the level B: 2 kg. of industrial propylene (6% of propane)
- At the level E: 1 kg. of industrial propylene (6% of propane)

The temperature of the furnace was maintained between 650° and 680° C. The pressure at the inlet of the coil was in the neighborhood of 4 bars absolute and of the order of 3.5 bars in the reaction zone. The hourly space velocity was of the order of 2,000 h.$^{-1}$. After operation for 120 hours, without any obstruction of the pipes occurring at any time, quantitative $CS_2$ yields were obtained which titrated, before rectification, only 150 p.p.m. (parts per million) of benzene and 100 p.p.m. of thiophen. The ratio of carbon to excess of sulphur was less than 0.02 percent by weight.

EXAMPLES 6 TO 8

Continuous operations for the sulphuration of propylene were carried out in a sulphurating apparatus comprising in this case a coil of the same type as that of Examples 1 to 4 and a reactor packed with Raschig rings.

The sulphur, of which the total excess was of the order of 20 percent, was introduced through 4 at the inlet of the coil at a temperature of 150° C., optionally after having been diluted with a fraction of $CS_2$ emanating from recycling of the production (pipe 5).

As hydrocarbon charge, non-preheated propylene was injected both into the coil at the level of the point E and into the reactor at the level of the base (C). The hourly space velocity varied between 200 and 600 h$^{-1}$.

The other reaction conditions and the results obtained are summarized in the following table:

| ex. no. | dura- tion (hours) | Rates of flow (in kg/h) su- lp- hur | $C_3H_6$ at E | $C_3H_6$ at C | dilu- $CS_2$ kg/h | absolute pressure (bars) | reaction temp. (°C) | impurities in the $CS_2$ in p.p.m. ben- zene | thi- ophen |
|---|---|---|---|---|---|---|---|---|---|
| 6 | 170 | 83 | 3 | 7 | 30 | 4 | 680 to 750°C | 100 | 500 |
| 7 | 170 | 83 | 5 | 5 | 22 | 3.5 | 680 to 750°C | 150 | 300 |
| 8 | 90 | 82 | 5 | 5 | 22 | 3 | 680 to 750°C | 100 | 280 |

The rate of conversion of propylene to $CS_2$ was in the neighborhood of 99 percent.

The percentage (by weight) of carbon in the sulphur varied between 0.1 percent and 0.5 percent in the three experiments.

EXAMPLES 9 TO 11

Operations for the continuous manufacture of carbon disulphide by simultaneous sulphuration of natural gas containing 96 percent of methane and industrial propylene (containing 8 percent of propane) were carried out in the sulphurating apparatus of Examples 1 to 4 (coil 1, without the reactor 3).

The liquid sulphur was introduced through the pipe 4 at an initial temperature of 140° C.

The hydrocarbon charge at ambient temperature was injected as follows:

Example 9: mixed methane and propylene at B, E and F
Example 10: methane at G, propylene at A, E, F
Example 11: methane at G, propylene at B and F.

The other reaction conditions are summarized in the following table:

| ex. no. | dura- tion (hours) | Rates of flow (in kg/h) su- lp- hur | $CH_4$ to- tal $C_3H_6$ | gas at A | gas at B | gas at E | gas at F | abso- lute pres- sure bars | reac- tion temp- era- ture (°C) | Hourly space velo- city (h$^{-1}$) |
|---|---|---|---|---|---|---|---|---|---|---|
| 9 | 75 | 100 | 3.55 9.2 | | 5.75 | 5.1 | 1.9 | 3.1 | 645–670 | 1250 |
| 10 | 155 | 150 | 5.4 14 | 5.6 | | 5.6 | 2.8 | 3.9 | 650–670 | 1670 |
| 11 | 120 | 160 | 9.6 8.7 | | 6.1 | | 2.6 | 4.0 | 650–670 | 1740 |

The rate of conversion of the propylene was substantially quantitative, while that of the methane varied between 98 percent and 90 percent in the three different experiments. The purity of $CS_2$ obtained was similar to that of the products obtained in the preceding examples.

What is claimed is:

1. In a process for the continuous production of carbon disulfide by reacting sulfur in the vapor phase with an unsaturated aliphatic hydrocarbon in a sulfurating apparatus through which the sulfur is passed continuously entering at one end and exiting at the other end and in which the sulfur and the hydrocarbon are contacted at temperatures between about 660° C. and about 750° C. during a residence time between about 0.1 and about 20 seconds, the improvement which comprises introducing the hydrocarbon reactant at more than one inlet point in said sulfurating apparatus, said inlet point s being spaced successively away from the point of introduction of said sulfur, said points of introduction and said rate of introduction of said hydrocarbon reactant being controlled so as to maintain a stoichiometric excess of sulfur over hydrocarbon at each point of introduction thereof.

2. A process according to claim 1 wherein the points in the said sulphurating apparatus wherein the hydrocarbon charge is injected are disposed entirely within a furnace and the gaseous effluents are immediately treated for the recovery of the carbon disulphide.

3. A process according to claim 1, wherein the sulphurating apparatus includes a portion disposed within a furnace and a reactor disposed after the furnace and wherein at least one of the points of injection of hydrocarbon charge is into said reactor.

4. A process according to claim 1 wherein the sulphur is introduced into the sulphurating apparatus in liquid form at a temperature of about 130°–150° C., wherein the sulphurating apparatus is heated between 600° and 750° C. under a pressure of 1 to 10 bars before reacting with the hydrocarbon, the hourly space velocity of the reactants being greater than 1,000 hours$^{-1}$.

5. A process according to claim 1 wherein more than one hydrocarbon is injected in admixture at each injection point.

6. A process according to claim 1 wherein more than one hydrocarbon is injected, each hydrocarbon being injected at a separate point.

7. A process according to claim 1 wherein the hydrocarbon charge comprises an unsaturated aliphatic hydrocarbon and a saturated aliphatic hydrocarbon.

8. A process according to claim 7 wherein the hydrocarbon charge comprises methane and propylene separately introduced into the sulphurating apparatus in $CH_4 : C_3H_6$ ratios of between 1:0.1 and 1:10 by weight.

9. A process according to claim 1 wherein the hydrocarbon is selected from the group consisting of an olefin and a diolefin.

* * * * *